United States Patent [19]

Lupke

[11] Patent Number: 5,576,032
[45] Date of Patent: Nov. 19, 1996

[54] EXTRUSION DIE WITH INTERCHANGEABLE EXTRUSION NOZZLES

[76] Inventor: Manfred A. A. Lupke, 92 Elgin Street, Thornhill, Ontario, Canada, L3T 1W6

[21] Appl. No.: 167,943
[22] PCT Filed: May 11, 1992
[86] PCT No.: PCT/CA92/00199
§ 371 Date: Jan. 13, 1994
§ 102(e) Date: Jan. 13, 1994
[87] PCT Pub. No.: WO92/22417
PCT Pub. Date: Dec. 23, 1992

[30] Foreign Application Priority Data

Jun. 17, 1991 [GB] United Kingdom ............... 9112997

[51] Int. Cl.$^6$ .................. B29C 47/06; B29C 47/26
[52] U.S. Cl. .............. 425/186; 264/171.12; 264/171.26; 425/191; 425/192 R; 425/381; 425/464; 425/466
[58] Field of Search ....................... 425/133.1, 466, 425/532, 539, 326.1, 380, 396, 393, 342.1, 387.1, 388, 392, 186, 191, 192 R, 381, 464; 264/508, 515, 286, 566, 568, 171.1, 171.12, 171.26

[56] References Cited

U.S. PATENT DOCUMENTS

| | | | |
|---|---|---|---|
| 3,994,646 | 11/1976 | Hauck | 425/326.1 |
| 4,712,993 | 12/1987 | Lupke | 425/326.1 |
| 4,770,618 | 9/1988 | Lupke | 425/326.1 |
| 4,936,768 | 6/1990 | Lupke | 425/326.1 |
| 5,023,029 | 6/1991 | Lupke | 425/326.1 |
| 5,123,827 | 6/1992 | Lupke | 425/133.1 |
| 5,296,188 | 3/1994 | Lupke | 425/326.1 |

FOREIGN PATENT DOCUMENTS

| | | |
|---|---|---|
| 0368096 | 5/1990 | European Pat. Off. . |
| 0381938 | 8/1990 | European Pat. Off. . |
| 0420019 | 4/1991 | European Pat. Off. . |
| 2552774 | 5/1977 | Germany . |

Primary Examiner—Jay H. Woo
Assistant Examiner—Joseph Leyson
Attorney, Agent, or Firm—Beveridge, DeGrandi Weilacher & Young, LLP

[57] ABSTRACT

The annular channel elongate nozzle of an extrusion die (10) suitable for use for extrusion into a travelling mold tunnel, has an inner core (16) profiled for attachment to any one of a number of interchangeable end fitting nozzles outlet (100). The profiling takes the form of a step between an upstream portion (22) of the core and a reduced diameter downstream portion (24). Each end fitting outlet has an annular sleeve (34) to fit about the downstream core portion to extend the surface of the upstream portion of the core. The sleeve abuts the step (26) thereby locating the end fitting outlet correctly. No locking means is necessary between the end fitting and the core in the region of the nozzle. Attachment may be effected between them at a location downstream of the point at which extrudate is extruded into the mold tunnel. Hence, attachment is not hampered by the presence of extrudate and the attachment (40, 20, 25) may not interfere with the flow of extrudate.

10 Claims, 4 Drawing Sheets

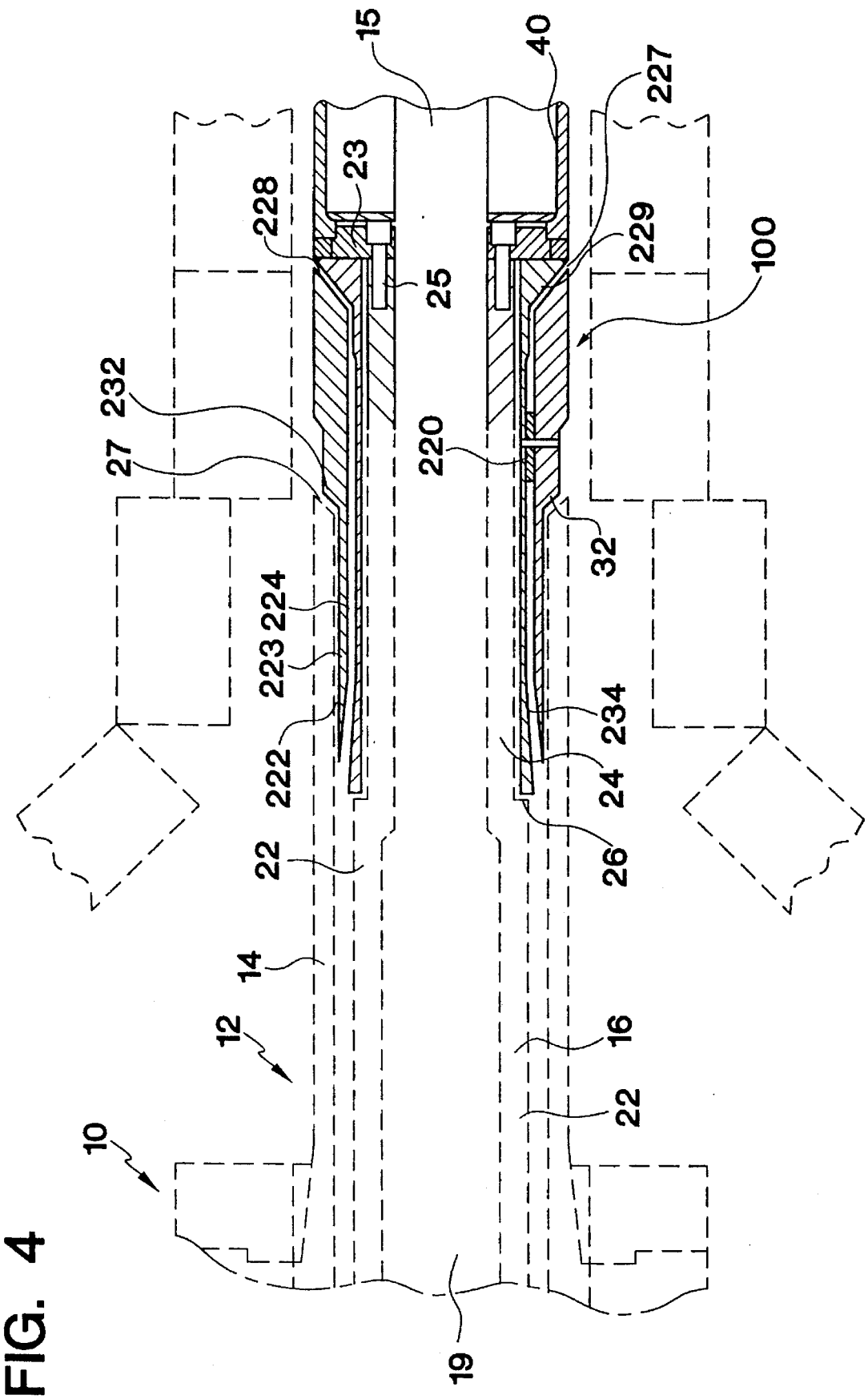

EXTRUSION DIE WITH INTERCHANGEABLE EXTRUSION NOZZLES

TECHNICAL FIELD

This invention relates to an extrusion die for use in the extrusion of thermoplastics material tube.

BACKGROUND ART

Profiled rigid or semi-rigid thermoplastics material tube is used for a number uses such as for electrical conduit and for drainage tube. It is frequently desirable or necessary to use profiled tube for strength reasons. The tube may be profiled as single walled corrugated tube, double walled corrugated tube, ribbed tube, or sometimes smooth walled tube may be used. Any ribs or corrugations on the tube may be helical or annular. Often, the molding and profiling is done by extruding a parison of extrudate into a travelling mold tunnel into which an elongate extrusion nozzle from an extrusion die extends to direct a parison of thermoplastic material against an inner wall of the mold tunnel.

The extrusion nozzle is usually different for different purposes. For example, an extrusion nozzle which is suitable for use with a travelling mold tunnel structured to mold ribbed tube, may be considerably different than one intended for other purposes. Moreover, it may be preferable for at least some purposes, for example the molding of ribbed tube, that the exit angle of the extrusion nozzle be 450 or more. For the molding of double walled corrugated tube, it may be desirable to provide a splitter to divide the flow of extrudate from the extrusion die into two coaxial streams. Many other variations are sometimes required.

To make the above-mentioned variations in the structure of the extrusion nozzle and, indeed, various other modifications, it has been necessary to dismantle the apparatus and change the extrusion nozzle at the point of its connection to the extrusion die. Shutting down of the production line is required and considerable time may be involved in the changing of the equipment.

SUMMARY OF THE INVENTION

It has now been discovered that it is possible to provide a single extrusion nozzle body which is adaptable to a variety of different extrusions by means of a plurality of end pieces.

According to the invention, there is provided an extrusion die system for use in the extrusion of thermoplastics material profiled tube, comprising: a die body having an elongate extrusion nozzle extending therefrom, the extrusion nozzle having a single annular channel therethrough between an inner and outer sleeve, an inner core extending out of the extrusion die body to beyond a distal end of the outer nozzle sleeve; the core having an upstream portion extending from the die body forming an upstream part of the inner surface and a downstream portion of reduced diameter stepped from the upstream portion through a step housed within the outer nozzle sleeve, a number of interchangeable end fittings for the nozzle, each end fitting comprising an annular sleeve to fit about the downstream portion of the core within the outer nozzle sleeve and abutting the step to extend the inner surface of the nozzle flush with the upstream portion of the core; each end fitting being provided with at least one diverging guide surface to direct extrudate from the extrusion nozzle to diverge from the annular sleeve of the end fitting.

The mandrel sleeve or a hollow core within the mandrel sleeve suitably extends, on the one hand, upstream into and beyond the die body and, on the other hand, downstream and beyond the extrusion nozzle. The hollow core or extended inner sleeve may be utilized to carry services such as gas to blow mold the extrusion when it exits from the extrusion nozzle or cooling fluid or suction for utilization at the surface of a cooling plug or various other services. Frequently, the tube being molded is molded in a travelling mold tunnel or other form of mold into which the exit end of the extrusion nozzle extends. In conventional apparatus, any interchange of parts to re-configure the exit channel of an extrusion nozzle may be extremely complex involving dismantling of the extrusion nozzle within or at the die body and replacement with a completely different extrusion nozzle. The invention may provide means to alter the extrusion nozzle to make the apparatus suitable for molding different tube by only interchanging a tip member part of the nozzle with minimum disruption of the apparatus. Frequently, also, a cooling plug may be mounted downstream of the extrusion nozzle on the hollow core for use within the travelling mold tunnel.

The present invention is intended to obviate difficulties in changes of configuration of the extrusion nozzle. Such difficulties have arisen because the extrusion nozzle is difficult to access due to the amount of upstream and downstream equipment mounted on the hollow core or mounted around the hollow core. The present invention provides for the mounting of interchangeable inner nose parts on the inner sleeve to alter the configuration of the extrusion nozzle without altering or substantially dismantling the rest of the equipment.

When a cooling plug is present downstream of the extrusion nozzle and bolted to the inner sleeve around the hollow core, it may be necessary to unbolt the cooling plug to locate the interchangeable extensions of the inner sleeve.

BRIEF DESCRIPTION OF THE DRAWINGS

Various embodiments of the invention will be described with reference to the accompanying drawings in which:

FIG. 4 shows yet another end fitting in a similar manner to that of FIG. 2.

DETAILED DESCRIPTION ACCORDING TO THE PREFERRED EMBODIMENTS OF THE PRESENT INVENTION

Figure 1:
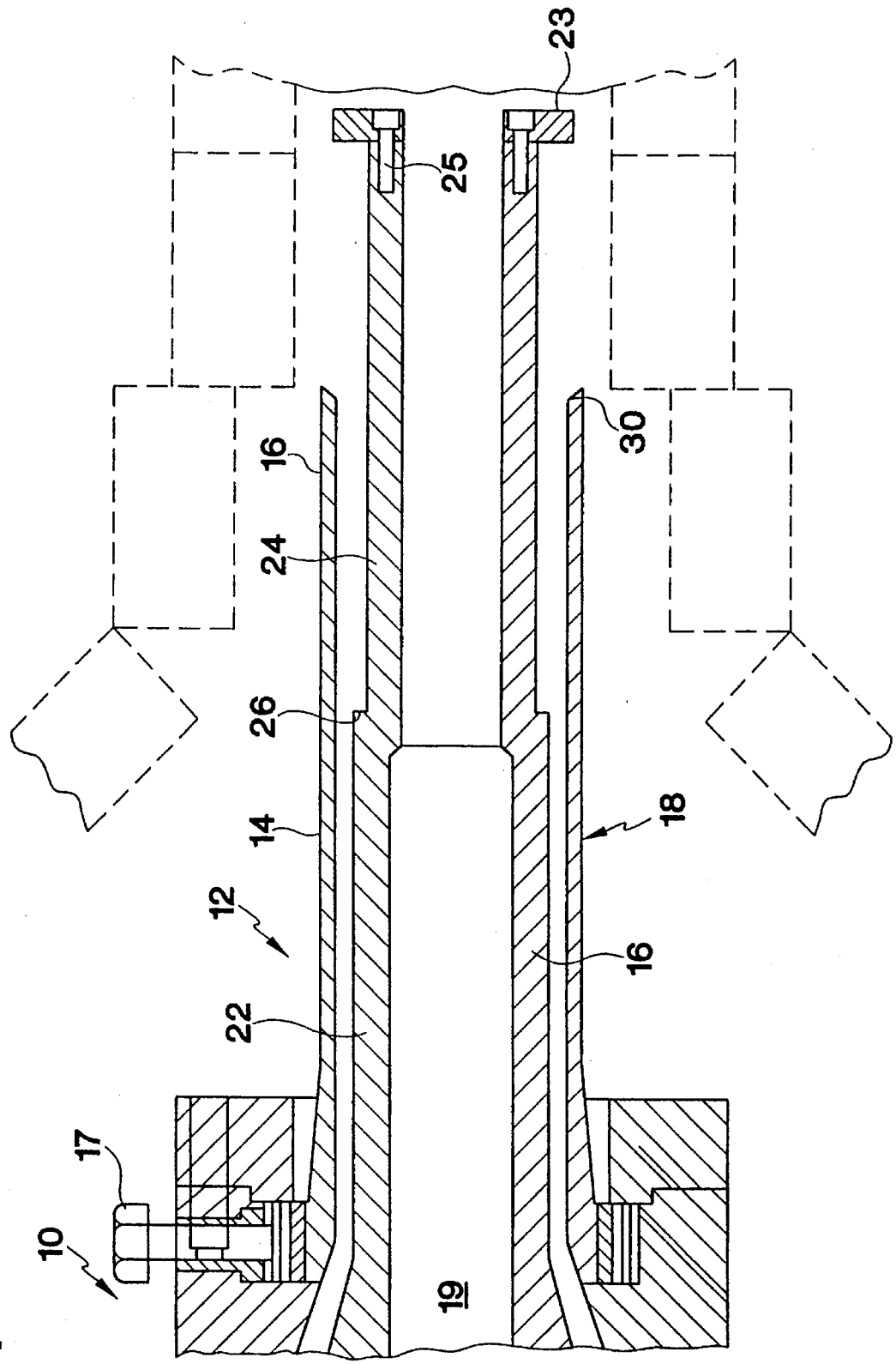
FIG. 1 shows one nozzle body which may be utilized in a system embodying the invention.

In the drawings an extrusion die body 10 is provided with a single elongate nozzle body 12 and different end fittings. FIG. 1, indicates an extrusion die 10, and an extrusion nozzle body 12 which is of general applicability. The particular die and nozzle shown may be suitable, for example, for the extrusion of single walled tube or for the extrusion of single walled corrugated tube.

The extrusion nozzle body 12 of FIG. 1 comprises an outer sleeve 14 and an inner sleeve 16. The inner sleeve 16 extends into the extrusion die 10 and forms a mid-portion of a hollow core 18 which extends both upstream and downstream of sleeve 16. Extension 19 of the hollow core 18 is within the extrusion die body 10 to which the sleeve 16 is fixed at its upstream end and to cooling plug 40. Sleeve 16 is shown an integral part of hollow core 18 but it should be understood that sleeve 16 may overlie core 18 if desired. Sleeve 16 has an upstream portion 22 having a first diameter which is greater than the diameter of a downstream portion 24 integral with the upstream portion and stepped to it are through step 26. Step 26 is illustrated as approximately right angled between portion 24 and 26 but other angles are possible.

The outer sleeve 14 of extrusion nozzle body 12 is fixed to the extrusion die body 10 at its upstream end, as for example by centering bolts 17. The length of the upstream portion of the core 18 is less than 75% of the length of the outer sleeve and, preferably, about 50% that length. At an open end downstream of nozzle body 12, an end piece 100 (see FIGS. 2, 3 and 4) is provided. The end piece 100 is chosen according to the extrusion required and different end pieces 100 are shown in each of FIGS. 2, 3 and 4. Where convenient, similar reference numerals will be used to reference similar parts.

Figure 2:
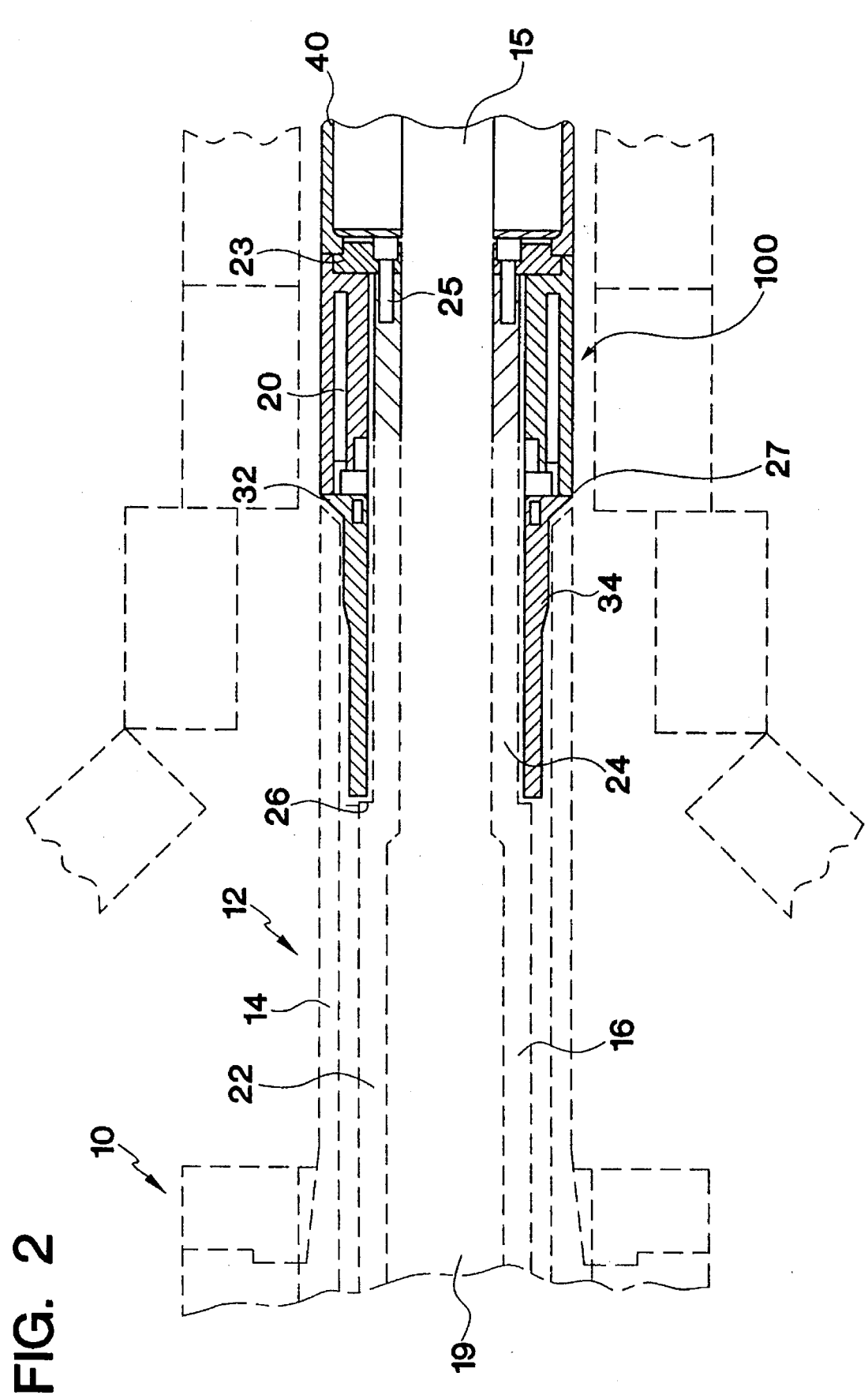
FIG. 2 shows one end fitting attached to the nozzle body of FIG. 1, which except at the downstream end is shown in broken lines.
Figure 3:
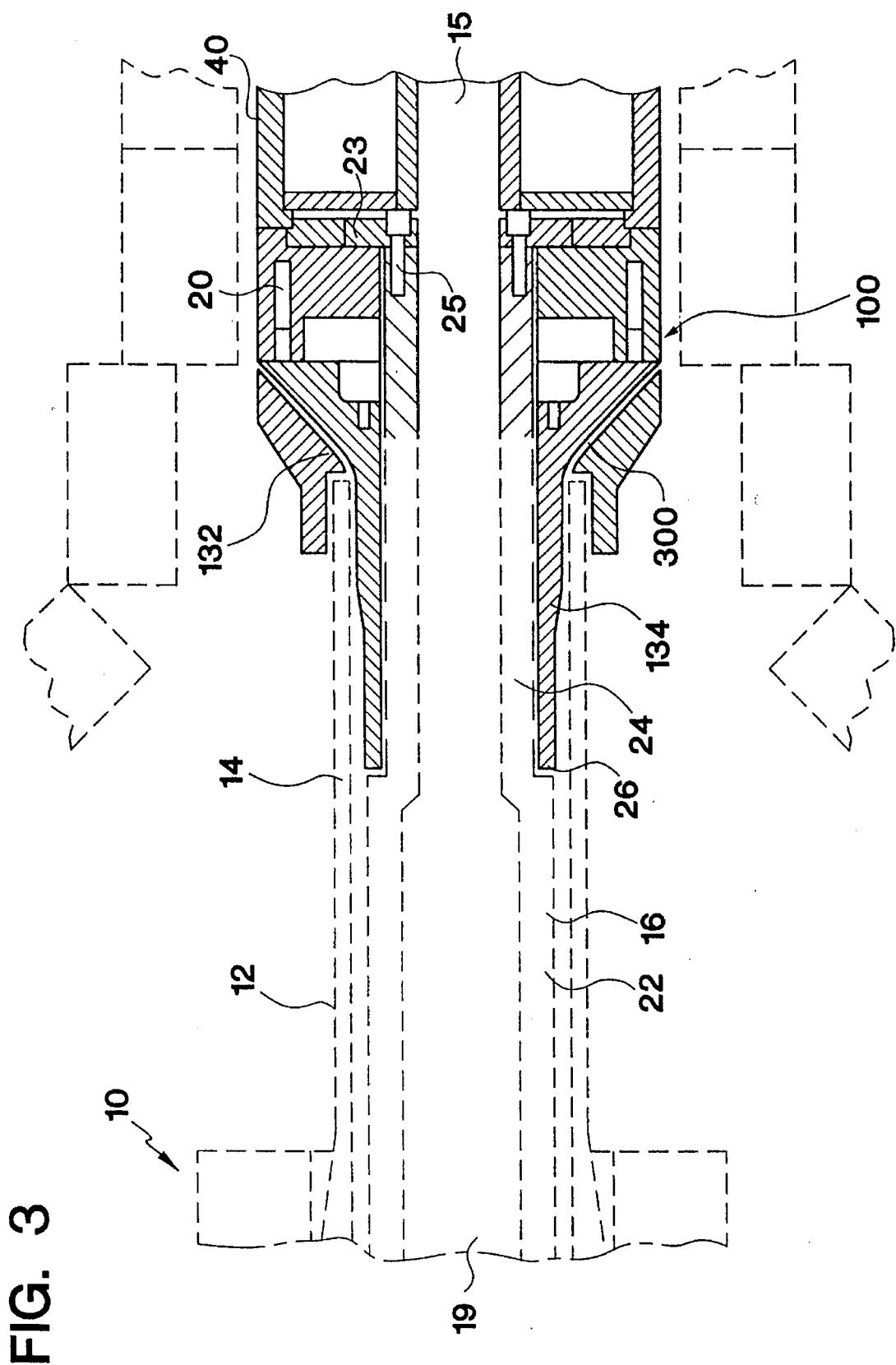
FIG. 3 shows yet another end fitting in a similar manner to that of FIG. 2.

Generally each end piece 100 comprises an annular sleeve 34 closely fitting over the downstream portion 24 of inner sleeve 16 of nozzle body 12. FIG. 1 shows one embodiment of a suitable nozzle body and FIGS. 2, 3 and 4 show end pieces fitted to it. It will be appreciated that other general nozzle body configurations are possible and that the end piece is chosen according to the extruded product required. The closely fitting sleeve 34 has an upstream portion having a diameter similar to that of the upstream portion 22 of inner sleeve 16 to extend it smoothly. Thus, when closely fitting sleeve 34 is fitted on the downstream portion 24 of sleeve 16, it may be abutted against step 26 so that the surface of closely fitting sleeve 34 and upstream portion 22 of inner sleeve 16 are flush and continuous.

The end piece 100 is held in position by means of annular stop ring 23 which bears in an upstream direction on downstream extension 20 of end piece sleeve 34. The annular stop ring 23 may itself be bolted to by bolts 25 to core 18. As shown in FIG. 2, annular stop ring 23 holds the upstream end of a cooling plug 40. Alternative engagement between sleeve 34 and sleeve 16 may be by means of screw threading if desired or by other convenient means. However, screw threading is less desirable since it may be fouled by plastic extrudate, thereby inhibiting easy change of end piece 100. It may be possible that sleeve 34 may be positionable in more than one axial location on sleeve 16 to widen or narrow the extrusion exit channel 27 between directing wall 32 of end piece 100 and the distal end of sleeve 34. If such different locations are possible, it is, of course, necessary to provide means to make the surface between sleeve 34 and the upstream portion 22 of sleeve 16 continuous.

As may be seen from FIG. 2, the sleeve 34 may be profiled to narrow the extrusion channel between sleeve 14 and itself. The angle of diverging wall 32 may, of course, be different from that illustrated and, in fact, will differ for interchangeable end pieces 100.

Mounting of the sleeve 34 on sleeve 16 may be by unbolting bolts 25 and sliding the sleeve 34 into position. No other disruption of the apparatus is necessary.

It may be seen that by the provision of different configurations of end piece 100, a large number of different profiles of tube may be obtained. FIGS. 3 and 4 show examples of other configurations of end piece 100 utilizable for different purposes. These embodiments are shown as exemplary only and it will be clear that many other variations are possible.

FIG. 3 illustrates an embodiment which is suitable for the molding of ribbed tube and also includes a cooling plug 40 mounted on core extension 15. Closely fitting sleeve 134, similar in concept to sleeve 34 but different in detailed structure, is mounted on downstream portion 24 of inner sleeve 16 to abut step 26. In this case the guide surface, i.e. diverging wall 132 leads extrudate outwardly to form a parison of diameter much larger than the diameter of nozzle body 12.

An outer guide die lip 300 may be screw threadedly attached to the end of sleeve 14 and may be adjustable in position thereon to provide additional adjustment for the width of the exit channel. Such adjustment may be by conventional means.

The profiling of sleeve 134 is slightly different to that of sleeve 34 to indicate differences which are possible. In fact, the arrangement of FIG. 3 is more suitable for the production of ribbed tube. Annular stop ring 23 again holds end piece 100 in position in a somewhat similar manner to that described in relation to FIG. 2.

FIG. 4 shows an appreciably different structure for end piece 100. In FIG. 4, means are provided to split the flow of extrudate into two streams so that double walled tube may be provided. The arrangement is somewhat similar to the splitting arrangement for streams within an extruded nozzle as described and claimed in U.S. Pat. No. 4,770,618 issued to Manfred Lupke on Sep. 13, 1988.

Sleeve 234 of end piece 100 in FIG. 4 is mounted on downstream portion 24 of inner sleeve 16 to abut step 26 as also shown in FIGS. 1 and 2 for sleeves 34 and 134 respectively. Sleeve 234, however, also incorporates a spider 220. Spider 220 carries an outer dividing sleeve 223.

Divider sleeve 223 projects in an upstream direction to divide the extrusion passage between inner sleeve 16 and outer sleeve 14 into two parts 222 and 224. Extrudate flowing in passage 222 will exit through an exit extrusion channel between the end of sleeve 14 and directing wall 232 which is formed by a shoulder on the outer surface of sleeve 223.

Extrudate flowing in channel 224 will pass between the legs of the spider 220 to a second exit passage 229. Exit passage 229 is formed between directing wall 227 of downstream extension of sleeve 234, and directing wall 228 of downstream extension of divider sleeve 223. The whole structure of end piece 100 may be somewhat similar to the structure of the divider described and claimed in U.S. Pat. No. 4,770,618.

The end piece 100 of FIG. 4, may be held in place by annular collar 23 and bolts 25 as previously described. The end pieces of FIGS. 2, 3 and 4 may be interchangeable with each other on apparatus as shown in FIG. 1. It is clear that by the provision of other interchangeable sleeves comparable to sleeves 34, 134, and 234 considerable versatility of a single basic apparatus may be achieved.

I claim:

1. An extrusion die system for use in the extrusion of thermoplastics material profiled tube, comprising:

a die body having an elongate extrusion nozzle extending therefrom, the extrusion nozzle having an upstream annular channel disposed between an inner core and an outer sleeve, said inner core extending out of the die body to beyond a distal end of the outer nozzle sleeve;

the inner core having an upstream portion extending from the die body forming an upstream core portion of a first diameter and a downstream core portion of reduced diameter stepped from the upstream portion through a step housed within the outer nozzle sleeve;

an end fitting for the nozzle;

said end fitting comprising a first annular sleeve to fit about the downstream core portion of the core within the outer nozzle sleeve and abutting the step where the outer surface of the annular sleeve of said end fitting defines the inner wall of an end fitting extrudate channel which is flush with the upstream portion of the core and coaxial with the upstream core channel; said annular sleeve being provided with at least one diverging guide surface for extrudate to direct extrudate to diverge from the extrudate channel, and said end fitting having an additional annular sleeve extending into the annular channel of the extrusion nozzle when the end fitting abuts the step and supported on the first annular sleeve by a spider to split flow of extrudate within the annular channel into coaxial annular streams.

2. A system as claimed in claim 1 in which the first annular sleeve of the end fitting fits slidably about the downstream portion of the core.

3. A system as claimed in claim 2 in which the end fitting is held in position by an annular ring attached about the core downstream of the end fitting.

4. A system as claimed in claim 1 in which the length of the upstream portion of the core is less than 75% of the length of the outer nozzle sleeve.

5. A system as claimed in claim 4 in which the length of the upstream portion of the core is about 50% of the length of the outer nozzle sleeve.

6. A system as claimed in claim 5 in which said diverging guide surface extends to a diameter greater than that of the outer nozzle sleeve.

7. A system as claimed in claim 1 in which the additional annular sleeve has at least one diverging guide surface.

8. An extrusion die system as claimed in claim 7, wherein said outer sleeve of said nozzle has a downstream end which cooperates with said guide surface of said additional annular sleeve in forming an extrudate guide channel within said die system.

9. An extrusion die system as claimed in claim 8, wherein said downstream end of said outer sleeve has a tapered interior surface substantially parallel to said guide surface of said additional annular sleeve.

10. An extrusion die system as claimed in claim 8, wherein said downstream end of said outer sleeve is adjustable lengthwise of said nozzle to adjust gap of said extrudate guide channel.

* * * * *